US006887917B2

(12) United States Patent
Yang et al.

(10) Patent No.: US 6,887,917 B2
(45) Date of Patent: May 3, 2005

(54) CURABLE PRESSURE SENSITIVE ADHESIVE COMPOSITIONS

(75) Inventors: Jie Yang, Woodbury, MN (US); Stephen A. Johnson, Woodbury, MN (US); William L. Kausch, Cottage Grove, MN (US); Ying-Yuh Lu, Woodbury, MN (US); Steven J. McMan, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 48 days.

(21) Appl. No.: 10/331,374

(22) Filed: Dec. 30, 2002

(65) Prior Publication Data

US 2004/0127594 A1 Jul. 1, 2004

(51) Int. Cl.[7] ............................... C08F 2/46
(52) U.S. Cl. .................. 522/90; 522/96; 522/93; 522/95; 522/104; 522/106; 522/107; 522/109; 522/110; 522/111; 522/112; 428/343; 428/345; 428/349; 428/355 R; 428/355 EN; 428/355 AC; 428/355 N
(58) Field of Search ................. 522/90, 93, 95, 522/96, 104, 106, 107, 109, 110, 111, 112; 428/343, 345, 349, 355 R, 355 EN, 355 AC, 355 N; 525/903

(56) References Cited

U.S. PATENT DOCUMENTS

| | | | |
|---|---|---|---|
| 3,776,805 A | | 12/1973 | Hansen |
| 4,488,919 A | * | 12/1984 | Butler ..................... 156/153 |
| 5,011,560 A | * | 4/1991 | Nakai et al. ............. 156/273.3 |
| 5,137,055 A | * | 8/1992 | Matsushima et al. .. 137/630.14 |
| 5,151,454 A | * | 9/1992 | Goto et al. .................. 522/93 |
| 5,187,007 A | * | 2/1993 | Ebe et al. .................. 428/343 |
| 5,252,694 A | | 10/1993 | Willett et al. |
| 5,360,873 A | * | 11/1994 | Ohkawa et al. ............. 525/193 |
| 5,432,797 A | * | 7/1995 | Takano ...................... 714/718 |
| 5,462,797 A | | 10/1995 | Williams et al. |
| 5,475,038 A | * | 12/1995 | Skoultchi ................... 522/96 |
| 5,578,657 A | | 11/1996 | Inoue et al. |
| 5,593,759 A | * | 1/1997 | Vargas et al. ............... 428/200 |
| 5,612,136 A | | 3/1997 | Everaerts et al. |
| 5,668,198 A | | 9/1997 | Suhadolnik et al. |
| 5,668,199 A | | 9/1997 | Suhadolnik et al. |
| 5,679,794 A | | 10/1997 | Suhadolnik et al. |
| 5,747,551 A | * | 5/1998 | Lewandowski et al. ....... 522/95 |
| 5,883,148 A | | 3/1999 | Lewandowski et al. |
| 5,895,801 A | * | 4/1999 | Lee ........................... 525/301 |
| 5,897,727 A | | 4/1999 | Staral et al. |
| 5,905,099 A | | 5/1999 | Everaerts et al. |
| 5,955,512 A | | 9/1999 | Numazawa et al. |
| 5,959,775 A | | 9/1999 | Joseph et al. |
| 5,989,778 A | | 11/1999 | Hozumi |
| 6,017,603 A | | 1/2000 | Tokuda et al. |
| 6,042,943 A | | 3/2000 | Levy |
| 6,049,419 A | | 4/2000 | Wheatley et al. |
| 6,166,212 A | | 12/2000 | Galbo et al. |
| 6,180,200 B1 | | 1/2001 | Ha et al. |
| 6,194,317 B1 | | 2/2001 | Kaisaki et al. |
| 6,277,485 B1 | | 8/2001 | Invie et al. |
| 6,423,392 B1 | * | 7/2002 | Koch et al. ................. 428/42.3 |
| 6,465,645 B1 | | 10/2002 | Wood et al. |
| 6,589,623 B2 | * | 7/2003 | Roth ........................ 428/40.1 |
| 6,645,617 B1 | | 11/2003 | Okazaki et al. |
| 6,764,804 B2 | * | 7/2004 | Bourdelais et al. ......... 430/201 |
| 2001/0025083 A1 | | 9/2001 | Stark et al. |
| 2003/0192638 A1 | | 10/2003 | Yang et al. |

FOREIGN PATENT DOCUMENTS

| | | | |
|---|---|---|---|
| EP | 0 729 494 B1 | 8/1998 | |
| EP | 1 142 912 A1 | 10/2001 | |
| EP | 1 375 617 A1 | 1/2004 | |
| EP | 1 375 618 A1 | 1/2004 | |
| GB | 1 550 382 | 8/1979 | |
| JP | 2-178380 | 7/1990 | |
| JP | 6-89462 | 3/1994 | |
| JP | 6-140090 | 8/1994 | |
| JP | 10-1659 | 1/1998 | |
| JP | 10-25453 | 1/1998 | |
| JP | 10-46109 | 2/1998 | |
| JP | 10-140090 | 5/1998 | |
| WO | WO 84/03837 | 10/1984 | |
| WO | WO 9413749 A1 | * 6/1994 | ............. C09J/4/06 |
| WO | WO 95/13328 A1 | 5/1995 | |
| WO | WO 98/36325 | 9/1998 | |
| WO | WO 00/32710 A1 | 6/2000 | |
| WO | WO 02/06413 A1 | 1/2002 | |
| WO | WO 02/086623 A1 | 10/2002 | |

OTHER PUBLICATIONS

1992 Annual Book of ASTM Standards, ASTM D 3330–90, "Standard Test Methods for Peel Adhesion of Pressure–Sensitive Tape at 180° Angle".
1983 Annual Book of ASTM Standards, ASTM E 96–80, "Standard Test Methods for Water Vapor Transmission of Materials".
Annual Book of ASTM Standards, ASTM D 1003–95. "Standard Test Method for Haze and Luminous Transmittance of Transparent Plastics".

* cited by examiner

Primary Examiner—James J. Seidleck
Assistant Examiner—Sanza L. McClendon
(74) Attorney, Agent, or Firm—Lisa P. Fulton

(57) ABSTRACT

Curable pressure sensitive adhesive compositions comprising an acrylate copolymer, a mono-acrylate oligomer, a multi-acrylate oligomer having from 2 to 5 acrylate functional groups per molecule, and a photoinitiator, the adhesive exhibiting pressure sensitive adhesive characteristics and forms at least a semi-interpenetrating polymer network when cured; wherein the semi-IPN has an average molecular weight between crosslinks ($M_c$) greater than about 3000, and the cured adhesive has a peel strength greater than about 40 N/dm. Embodiments of the adhesive compositions, when cured, are optically clear and resistant to heat and moisture.

21 Claims, No Drawings

CURABLE PRESSURE SENSITIVE ADHESIVE COMPOSITIONS

TECHNICAL FIELD

This invention relates to adhesive compositions, and more particularly to adhesive compositions that can be both pressure sensitive and curable.

BACKGROUND

Pressure sensitive adhesives (PSA) have been used in a variety of applications, as they provide many desirable characteristics such as removability and ease of application. For a more permanent and highly smooth bond, some conventional PSAs may not necessarily have sufficient strength to hold and maintain its adherence on certain substrates. Furthermore, a conventional PSA when applied to certain materials, may not be able to withstand exposure to elevated temperatures or high humidity. For example, application of a PSA on acrylic sheets and polycarbonate sheets that are known to be "outgassing materials" and difficult to bond, can result in bubbling and delamination.

Curable adhesives (e.g. heat or light cured) have been used in applications where substrates require substantial permanency and high strength adherence. Conventional curable adhesives, however, are typically not provided as a PSA nor in the form that is easy to apply, such as a tape. For optical product applications (e.g. glazings), curable adhesives have been desirable, as they can provide optically clear, strongly adhered laminates (e.g. layered substrates).

To achieve both strength and ease of application, hybrid compositions have been developed that can be used in optical applications. For example, a light curable, polyester based adhesive has been used for plastic glazing applications. In digital video disc (DVD or optical discs) bonding and CRT applications, a liquid adhesive formulation has been used. For bead bonding in making retroreflective articles, a curable polymeric network has been suggested.

Strength and application, however, are not the only criteria that many optical substrates/laminates require. Certain optical products are exposed to harsh environmental conditions, such as heat, UV (solar) light, water, etc. For example, vehicle windshields generally exist in outdoor conditions that submit them to all types of weather. These windshields typically include substrates such as acrylic or polycarbonate, adhered to a solar or infra-red (IR) reflecting film made from a multi-layer optical film (MLOF) (3M Co; St. Paul, Minn.). The materials may become optically obstructed if the adhesion between the layers is damaged or compromised.

What is desired is an adhesive composition that can be used in applications where optical clarity is needed, as well as ease of application for efficient manufacturing. An adhesive composition whose integrity is maintained even when exposed to extreme temperature and moisture conditions is also desired.

SUMMARY OF THE INVENTION

The invention provides adhesive compositions that can be optically clear and environmentally stable. In certain embodiments, the adhesive compositions can be applied as a pressure sensitive adhesive (and therefore removable if desired), and subsequently cured to provide a more permanent bond by forming a secure structural adhesive bond. As a PSA, the composition comprises, among other things, components having curable functional groups that can be activated by ultra-violet radiation and other energy sources. Curing can be accomplished via free radical polymerization, where an interpenetrating polymeric network is formed. Advantageously, UV absorbers can also be present in certain adhesive compositions.

Embodiments of the invention can be optically transmissive in both the cured and uncured state. The compositions can therefore be particularly useful in bonding applications that require optical clarity as well as sufficient bond strength. Compositions of the invention can also be used in bonding substrates that are exposed to elevated temperatures and moisture. Thus, exemplary compositions can be used to laminate out-gassing substrates such as acrylic or polycarbonate sheets, where resultant laminates can exhibit resistance to bubbles, delamination, haze and whitening.

In one aspect, an adhesive composition includes an acrylate copolymer; acrylated oligomers and an initiator that initiates free radical polymerization. The acrylated oligomers component can comprise a mono-acrylate oligomer, and a multi-acrylate oligomer having 2 to 5 acrylate functionalities per molecule. The blend of all components provide a pressure sensitive adhesive that can be cured, such as by UV irradiation, to form at least a semi-interpenetrating polymer network (IPN) having an average molecular weight between crosslinks ($M_c$) greater than about 3000. The cured adhesive can exhibit a peel strength greater than about 40 N/dm, as tested according to test methods described herein.

In another aspect, an adhesive composition is provided that includes an acrylate copolymer; acrylated oligomers; a photoinitiator that initiates free radical polymerization; a UV absorber.

In certain aspects, the adhesive is optically transmissive and therefore useful in optical element applications. Thus, in another aspect, the invention provides an optical element that includes at least one optical substrate having a curable pressure sensitive adhesive composition applied thereon and another substrate positioned adjacent to the adhesive. Either one or both of the substrates can be an outgassing material.

In a further aspect, a method of using a curable pressure sensitive adhesive is provided, where the method includes: providing an optical substrate; applying onto a major surface of said optical substrate, an adhesive composition comprising a blended composition of an acrylate copolymer; a mono-acrylate oligomer; a multi-acrylate oligomer having 2 to 5 acrylate functionalities per molecule; and a photoinitiator, the composition having pressure sensitive adhesive characteristics; positioning a second substrate adjacent the optical substrate with the adhesive therebetween; and curing the adhesive using actinic energy to form an interpenetrating polymeric network.

The details of one or more embodiments of the invention are set forth in the accompanying drawings and the description below. Other features, objects, and advantages of the invention will be apparent from the description and drawings, and from the claims.

DETAILED DESCRIPTION OF EMBODIMENTS

In embodiments of the invention, a composition is provided that includes an acrylate copolymer, a mono-acrylate oligomer, a multi-acrylate oligomer, and an initiator, such as a photoinitiator. The components, when blended, provide an adhesive that can be applied as a pressure sensitive film or tape. Upon exposure to actinic radiation, the applied blend can then cure to harden to provide a secure, structural bond. The bond can be optically clear, therefore making the adhesive composition useful in optical products (e.g. glazings, laminates, elements, and the like).

The acrylate copolymer is generally a prepolymerized component, that in certain embodiments, exhibits PSA characteristics. A wide variety of acrylate copolymers can be used and are known in the polymer and adhesive arts, as are methods of preparing the monomers and polymers. Acrylate copolymers are generally prepared by polymerizing (meth) acrylate monomers, e.g., polymers prepared from one or more (meth)acrylate monomers, optionally with any one or more of a variety of other useful monomers; where "(meth) acrylate" monomer is used to refer collectively to acrylate and methacrylate monomers. The copolymers can be present in combination with other, non-(meth)acrylate, e.g., vinyl-unsaturated, monomers. Suitable acrylate copolymers include, but are not limited to, isooctyl acrylate/methyl acrylate/acrylic acid (IOA/MA/AA) and isooctyl acrylate/acrylic acid (IOA/AA). The acrylate copolymers can include optional crosslinkers such as, for example, bis-aziridine or multi-functional isocyanates. Specific examples of acrylate copolymers useful according to the invention include those prepared from free radically polymerizable acrylate monomers or oligomers such as described in U.S. Pat. No. 5,252,694 at col. 5, lines 35–68.

Examples of useful monomers for the acrylate copolymer include, but not exclusively, the following classes:

Class A—acrylic acid esters of an alkyl alcohol (preferably a non-tertiary alcohol), the alcohol containing from 1 to 14 (preferably from 4 to 14) carbon atoms and include, for example, methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate, and dodecyl acrylate;

Class B—methacrylic acid esters of an alkyl alcohol (preferably a non-tertiary alcohol), the alcohol containing from 1 to 14 (preferably from 4 to 14) carbon atoms and include, for example, methyl methacrylate, ethyl methacrylate, n-propyl methacrylate, n-butyl methacrylate, isobutyl methacrylate and t-butyl methacrylate;

Class C—(meth)acrylic acid monoesters of polyhydroxy alkyl alcohols such as 1,2-ethanediol, 1,2-propanediol, 1,3-propane diol, the various butyl diols, the various hexanediols, glycerol, such that the resulting esters are referred to as hydroxyalkyl (meth)acrylates;

Class D—multifunctional (meth)acrylate esters such as 1,4-butanediol diacrylate, 1,6-hexanediol diacrylate, glycerol diacrylate, glycerol triacrylate, and neopentyl glycol diacrylate although these monomers are generally not preferred for reactive extrusion or melt blending;

Class E—macromeric (meth)acrylates such as (meth) acrylate-terminated styrene oligomers and (meth)acrylate-terminated polyethers, such as are described in PCT Patent Application WO 84/03837 and European Patent Application EP 140941;

Class F—(meth)acrylic acids and their salts with alkali metals, including, for example, lithium, sodium, and potassium, and their salts with alkaline earth metals, including, for example, magnesium, calcium, strontium, and barium.

As used herein and in the claims, a "mono-acrylate oligomer" is defined as an oligomer having only one acrylate functional group. The mono-acrylate can provide the backbone for the polymer which forms upon blending it with an acrylate copolymer and a multi-acrylate oligomer as described herein. A "multi-acrylate oligomer," as used herein and in the claims, is intended to signify an oligomer having at least two acrylate functional groups. The acrylate functionalities can be terminal groups, or they can be grafted onto a site within the oligomer chain. Upon blending with the other components of the composition, the multi-acrylate oligomer provides the crosslinks or branches needed to form a network with the mono-acrylate oligomer backbone.

The mono-acrylate and mutli-acrylate oligomers are chosen and provided in amounts such that the adhesive composition can have a desirable balance of cohesive and adhesion strength. In some embodiments, the oligomers are present in amounts to balance such characteristics with optical clarity and heat/humidity stability as well. The oligomers can be present in sufficient amounts relative to each other so that the composition can achieve and maintain that balance. Insufficient amounts of multi-acrylate oligomer, for example, can result in a lack of cohesive strength. If an excessive amount of multi-acrylate oligomer is used relative to the mono-acrylate concentration, a resultant composition may have too much crosslinking, (e.g. an average molecular weight between crosslinks, $M_c$, that is too low), which can consequently have detrimental effects on the adhesion strength of the composition. Exemplary adhesive compositions according to the invention can have a $M_c$ value greater than about 3000. Depending on the ratio of the amounts of oligomers, and the number of acrylate functionalities in the multi-acrylate oligomer (and thereby the molecular weights of the components), certain adhesive compositions can form a semi-IPN having an $M_c$ value greater than about 5000.

Compositions according to the invention can have greater amounts of mono-acrylate oligomer than multi-acrylate oligomer. This aids in providing an optically clear and stable cured adhesive. In certain compositions, the ratio of the amounts of mono-acrylate oligomer to multi-acrylate oligomer is about 1:1. It is contemplated that the ratio of mono- to multi-acrylate oligomer can be 3:1, and can also be up to about 6:1. This ratio can, of course, be adjusted depending on the molecular weight (and extent of acrylate functionalities) of the acrylated oligomers.

Selection of the acrylate-functionalized oligomers can be based on desired performance criteria or characteristics of a resulting adhesive composition. In one aspect, it can be desired that the composition have pressure sensitive adhesive characteristics for ease of application onto substrates, as well as removability when necessary. In another aspect, however, heat and humidity stability can be particularly desirable characteristics for the adhesive when it is applied to substrates ultimately used for laminates intended for outdoor use or in other environments having elevated temperatures and/or high humidity. Cohesive and adhesive strength of a cured adhesive composition can therefore be modified, depending on the resulting interpenetrating polymeric network that is achieved by selection of the oligomers.

Suitable mono- and multi-acrylate oligomers for compositions of the invention can have a glass transition temperature (Tg) of less than about 20° C. The acrylate functionalized oligomers useful in the adhesive composition can be represented by structure (I) below:

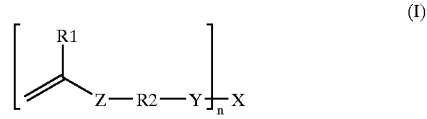

where R1 is H or CH$_3$;

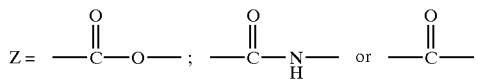

R2 is (CH$_2$)$_m$, where m is 0–6;

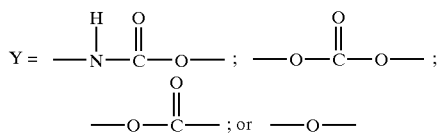

X is an n-valent radical group such as a polyol linkage or an alkyl group; and n is greater than or equal to 1.

For structure (I), wherein n is equal to 1, a mono-acrylate oligomer is provided. When n is greater than 1, a multi-acrylate oligomer is provided. In certain embodiments of the invention, oligomers are utilized having n being from 1 to 6. Exemplary compositions include a multi-acrylate oligomer comprising from 2 to about 5 acrylate functionalities per molecule. In an aspect of the invention, the adhesive composition has a mono-acrylate oligomer (n=1) in combination with a diacrylate oligomer (n=2).

In an exemplary composition, the acrylate functionalized oligomers can be urethane diacrylate oligomers (where Z in structure (I) is —COO, and n=2), represented by structure (II) below:

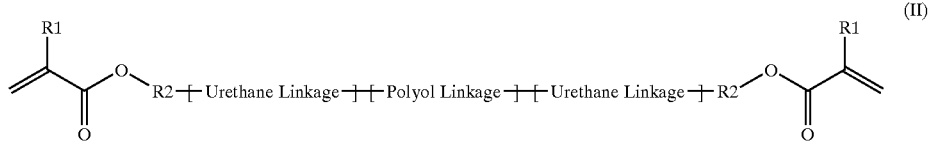

These oligomers can have a polyol linkage in structure (II) (or "X" as indicated in structure (I) above) that includes, for example, a methane moiety, a carbonate moiety, an ester moiety, or an ether moiety. A polyester polyol can be formed by reacting a polybasic acid (e.g., terephthalic acid or maleic acid) with a polyhydric alcohol (e.g., ethylene glycol or 1,6-hexanediol). A polyether polyol useful for making the acrylate functionalized urethane oligomer can be chosen from, for example, polyethylene glycol, polypropylene glycol, poly(tetrahydrofuran), poly(2-methyl-tetrahydrofuran), poly(3-methyl-tetrahydrofuran) and the like. Alternatively, the polyol linkage of an acrylated urethane oligomer (structure (II)) can be a polycarbonate polyol.

Acrylate functionalized urethane oligomers can be synthesized, for example, by reacting a diisocyanate or other polyvalent isocyanate compound with a polyvalent radical polyol to yield an isocyanate terminated urethane prepolymer. Subsequently, acrylates or methacrylates having a hydroxyl group can then be reacted with the terminal isocyanate groups of the prepolymer. Both aromatic and aliphatic isocyanates can be used to react with the urethane to obtain the oligomer. Examples of diisocyanates useful for making the acrylated oligomers are 2,4-tolylene diisocyanate, 2,6-tolylene diisocyanate, 1,3-xylylene diisocyanate, 1,4-xylylene diisocyanate, 1,6-hexane diisocyanate, isophorone diisocyanate and the like. Examples of hydroxy terminated acrylates useful for making the acrylated oligomers include, but are not limited to, 2-hydroxyethyl (meth)acrylate, 2-hydroxypropyl (meth) acrylate, 4-hydroxybutyl acrylate, polyethylene glycol (meth)acrylate and the like. A urethane mono-acrylate oligomer comprises one acrylate group and at least one urethane group. Mono-acrylate oligomers can be provided using commercially available urethane-acrylate oligomers, including, for example, GENOMER 1122 (Rahn USA Corp.; Aurora, Ill.) and EBECRYL CL 1039 (UCB Chemicals; Smyrna, Ga.). A urethane multi-acrylate oligomer can be, for example, any urethane oligomer having at least two acrylate functionalities, and in an aspect, less than about six functionalities. Suitable urethane multi-acrylate oligomers are also commercially available such as, for example, CN962, CN964, CN965, CN934, and CN 972 from Sartomer Co. (Exton, Pa.) and ACTILANE 130, 170, 270, and 290 from Akzo Nobel Resins (Baxley, Ga.) and GENOMER 4269 from Rahn USA Corp. (Aurora, Ill.) and EBECRYL 230, 270, 8803, 4827, and 6700 from UCB Chemicals (Smyrna, Ga.).

Alternatively, the acrylate functionalized oligomers can be polyester acrylate oligomers, acrylated acrylic oligomers, or polyether acrylate oligomers. Suitable acrylate oligomers include, for example, commercially available products such as CN131, an aromatic monoacrylate, and CN132, and aliphatic diacrylate, both of which are available from Sartomer Co. (Exton, Pa.). Useful polyester acrylated oligomers include CN292, CN2200, and CN2255 from Sartomer Co. (Exton, Pa.) and EBECRYL 81, 83, 450, and 2047 from UCB Chemicals (Smyrna, Ga.). Suitable polyether acrylated oligomers include GENOMER 3497, commercially available from Rahn USA Corp. (Aurora, Ill.) and CN550 from Sartomer Co. (Exton, Pa.).

The acrylate copolymers and the acrylated oligomers can be included in an adhesive composition according to the invention in any relative amounts that, in combination with the free radical initiator and other optional components if present, can result in a useful balance of adhesive properties (e.g., clarity, optionally, PSA characteristics, peel strength, heat & humidity stability) in both the uncured and cured states. Particularly useful characteristics are, among others, the optical clarity and heat/humidity stability the adhesive can exhibit. For the acrylate copolymer, an amount can be included that provides the functional properties of a pressure sensitive adhesive, as described herein and understood in the art.

In embodiments of the invention, the mono-acrylate and multi-acrylate oligomers are present in amounts relative to that of the acrylate copolymer and the total weight of the composition, that provides a desired combination of pressure sensitive adhesive properties, structural bond properties, optical clarity, and stability of these properties over time. In accordance with certain embodiments of the invention, the acrylated oligomers can be present in the adhesive composition at about 20 to about 60 wt. percent of the total adhesive composition.

At least one free radical initiator is included in the adhesive composition of the invention to initiate the polymerization, and thereby form a structural bond. Free radical initiators, such as photoinitiators that are useful for reacting or polymerizing acrylate materials are well understood, as are their use and the amounts to be included in an adhesive as described herein. Exemplary free radical photoinitiators useful for polymerizing the acrylated oligomers include the benzoin ethers, such as benzoin methyl ether or benzoin isopropyl ether, substituted benzoin ethers, such as anisoin methyl ether, substituted acetophenones, such as 2,2-diethoxyacetophenone and 2,2-dimethoxy-2-phenylacetophenone, substituted alpha-ketols, such as 2-methyl-2-hydroxypropiophenone, aromatic sulfonyl chlorides, such as 2-naphthalene-sulfonyl chloride, and photoactive oximes, such as 1-phenyl-1,2-propanedione-2(O-ethoxycarbonyl)oxime. Suitable free radical photoinitiators for use in the compositions of the invention, include, but are not limited to, commercially available compounds such as Irgacure 651 and 819 (CIBA Specialty Chemicals Corp.; Tarrytown, N.J.).

The amount of free radical initiator can be sufficient to cause polymerization of the adhesive composition and form a semi-interpenetrating polymer network. In an aspect, the amount of initiator can be in the range from a number about 0.01 to about 15 parts by weight free radical initiator for one hundred parts by weight total adhesive composition, with the range from about 0.1 to about 5 parts by weight being preferred.

Optional components that can be included in adhesive compositions of the invention include, for example, photosensitizers, grafting agents, crosslinkers, tackifiers, reinforcing agents, and other modifiers (e.g. plasticizers). Photosensitizers can be used to alter the wavelength sensitivity of a photoinitiator. A grafting agent can be used to cause inter-reaction of the acrylate copolymer and the acrylated oligomers. For example, a grafting agent such as 4-Acryloxy Benzophenone (ABP) can generate free radicals on the acrylate copolymer, which can then react with (meth) acrylate groups.

A crosslinker can be included in the adhesive in a useful amount that may improve properties of the adhesive, such as by crosslinking the acrylate copolymer. Such amounts are generally known in the art and will be understood by skilled artisans. Exemplary amounts of crosslinker can be in the range from about 0 to about 10 percent by weight, with preferred amounts being in the range from about 0.1 to about 5 percent by weight. Amounts outside of this range can also be useful, with a particular amount of crosslinker for any adhesive composition depending on a number of various factors including the chemistry of the crosslinker, the chemistry of the acrylate copolymer and acrylated oligomers, and the desired properties of the cured and uncured adhesive. Exemplary classes of useful crosslinkers are bis-aziridines and multi-functional isocyanates.

Optionally, and advantageously, embodiments of the invention can include a hindered amine light stabilizer (HALS). Adding such a stabilizer advantageously does not detract from the adhesive's ability to be both pressure sensitive and curable, nor does it detrimentally affect the optical clarity. Suitable hindered amine stabilizer compounds have been described in U.S. Pat. Nos. 5,668,198; 5,668,199; 5,679,794; 6,166,212; and 6,465,645. A commercially available compound, TINUVIN 123 (CIBA Specialty Chemicals Corp; Tarrytown, N.J.).

A UV absorbing component can optionally be included in the adhesive composition of the invention. Such a component can aid the adhesive, and thereby any product made using the adhesive, to provide UV-resistance, particularly radiation in the UV-A range, of less than about 410 nm. Suitable UV absorbers include, but are not limited to a benzotriazole, such as TINUVIN 928 (CIBA Specialty Chemicals Corp; Tarrytown, N.J.), a triazine, such as TINUVIN 1577 (CIBA Specialty Chemicals Corp; Tarrytown, N.J.), a benzophenone, such as UVINUL 3039 (BASF; Ludwigshafen, Germany), a benzoxazinone, such as UV-3638 (Cytec; Charlotte, N.C.), and/or an oxalanilide. Embodiments according to the invention exhibit properties that are characteristic of pressure sensitive adhesive compositions upon application, but before final cure into an IPN. Pressure sensitive adhesive (PSA) compositions are well known to those skilled in the art to possess properties that include: (a) aggressive and permanent tack; (b) adherence with no more than finger pressure; (c) sufficient ability to hold onto an adherend; and (d) sufficient cohesive strength. Certain PSAs can also be removed cleanly from its original target substrate. Materials that have been found to function well as PSAs include polymers designed and formulated to exhibit the requisite viscoelastic properties resulting in a desired balance of tack, peel adhesion and shear holding power. In accordance with embodiments of the invention, blending the acrylate copolymer, the monoacrylate oligomer, and the multi-acrylate oligomer can provide an adhesive composition that exhibits pressure sensitive characteristics.

Upon curing a composition according to the invention with any actinic or other radiation, a semi-interpenetrating polymer network (IPN) can be formed. A semi-IPN is a network having only one crosslinked network; whereas a full IPN can have at least two crosslinked networks. In aspects according to the invention, the semi-IPN comprises a network of crosslinked oligomers. Optionally, but only to the extent that performance characteristics are not compromised, a second network of crosslinked acrylate copolymers can be present. This second network, therefore characterizes the cured adhesive as a full-IPN.

Certain adhesive compositions according to the invention can be optically transmissive, (e.g., optically clear) in one or both of its uncured and cured state. Optical clarity allows the adhesive to be used in preparing optical elements, such as glazings (e.g. windows, windshields), computer monitor displays, CRTs, anti-reflective films, polarizers and the like. In embodiments of the invention, an adhesive composition can maintain its optical transmissivity (e.g. clarity) for a useful period of time under generally normal use conditions as well as in prolonged exposure to normal and extreme conditions. A balance of desired characteristics such as clarity, stability, bond strength, and integrity, can be achieved in an adhesive composition of the invention by modifying the selection of components or ingredients included in the adhesive, including, for example, the multi-acrylate oligomer (and its consitutent monomers), the monoacrylate oligomer, the acrylate copolymer and the free radical initiator. Additional but optional components can be included to balance the performance characteristics, as will be appreciated, including, for example, crosslinkers, grafting agents, photosensitizers, etc., in amounts that will balance and improve properties of the adhesive.

The adhesive compositions can exhibit desirable levels of optical clarity. Optical clarity can be measured in various ways, including a test described in ASTM D 1003-95. Exemplary adhesive compositions of the invention, when tested uncured using such test can exhibit a luminous transmission greater than about 90%, haze of less than about 2%, and opacity of less than about 1%. Upon curing, the optical clarity of certain cured adhesives, tested under similar conditions, exhibit similar optical clarity.

When an exemplary adhesive according to the invention is used to produce optical laminates, products can be stable at 90° C. when tested dry, and stable at 60° C. with 90% relative humidity (RH) for at least one week. Certain formulations can be stable at 80° C. with 90% RH for at least one week. As used herein "stable" is indicative of an uncompromised bond established by the secure structural bond formed by the cured adhesive.

Cured adhesive compositions according to the invention can exhibit "permanent" adhesion to a substrate. In embodiments of the invention, a cured adhesive exhibits a peel strength of greater than about 40 N/dm, when measured using tests described in the test methods below. Greater strengths can also be achieved by modifying components and their respective concentrations, for example, peel strengths greater than about 50 N/dm or peel strengths greater than about 60 N/dm.

The adhesives of the invention can be used, for example, to bond a variety of substrate materials, including, but not limited to, polymeric materials (e.g. polyesters), substantially rigid materials (e.g., some polycarbonates and acrylics), polymethyl methacrylate, flexible films (e.g. IR reflecting films, MLOFs), brightness-enhancing films, glass, and polarizer films. Many of these materials, particularly those that exhibit optical clarity or light transmissivity are often used to make optical products, such as glazings, photosensors, mirrors, polarizers, security films etc. (hereinafter, materials used for making optical products are referred to as "optical substrates"). Advantageously, because embodiments of the invention can exhibit good optical clarity, the adhesive compositions are particularly useful in bonding a variety of optical components, optical elements, and optical products.

Optical elements include articles and products that have an optical effect or optical application, such as screens for computers or other displays; components of such screens such as polarizing layers, reflective layers, and antireflective layers, selectively reflective layers such as infrared reflecting optically clear layers; coatings or films for windows which may polarize or reflect; other partially or fully reflective optically transmissive products, etc. Often, optical elements include one or more different layers of optical substrates typically layers or films that are at least partially optically transmissive, reflective, polarizing, or optically clear. An adhesive is used to bond the layers together. Optical substrates can include a variety of different materials, including, for example, polymer, glass, metal or metallized polymer, or combinations thereof. Representative examples of polymers include polycarbonate, polyester, polyurethane, polyacrylate, polyvinyl alcohol, polyethylene, polyvinyl chloride, cellulose triacetate and combinations thereof. Any one or more of these materials may also provide an intended physical property including flexibility, rigidity, strength, or support, reflectivity, antireflectivity, polarization, transmissivity (e.g. selective with respect to different wavelengths), etc.

Characteristic of certain optical substrates, however, is a phenomenon referred to in the art as "outgassing" or "outgas releasing." For example, rigid layers such as polycarbonates, polyacrylates, polyesters, etc. tend to be outgassing, particularly when they are provided as relatively thick components (e.g., in the range of millimeters or centimeters, as opposed to smaller dimensions). Examples of outgassing materials include polycarbonates and polyacrylates such as polymethyl methacrylate, having a thickness in the range from about one or three millimeters. Outgassing materials can adversely affect the stability, clarity, bond strength, or other performance properties of an adhesive. Bonding layers that include at least one outgassing substrate to produce, for example, optical laminates, can pose challenges in finding a compatible yet stable and strong adhesive. Applying an incompatible adhesive to an outgassing material can result in defects such as bubbles or partial to full delamination at the adhesive bond between the outgassing material and another layer. This can occur particularly when the opposing or adjacent layer (to the outgassing material) exhibits low vapor transmissivity, such that any released gas is inhibited or prohibited from passing through. The low vapor transmissive material can act as a barrier to the gas, resulting in the gas collecting at the adhesive interface and causing bubbling, delamination, reduced bond strength, or loss of clarity. Advantageously, adhesive compositions of the invention can be used in these and other applications. Embodiments of the invention offer improved bond strength and stability and can therefore reduce or eliminate such bubbling or delamination even where the adhesive is used to bond an outgassing layer to a low moisture vapor transmissive layer.

The threshold level of moisture vapor transmissivity that can cause adhesive bonds to be compromised can depend on various factors such as the composition of the outgassing material, the amount of gas it produces, conditions of use, and the composition and overall strength, integrity, and stability of an adhesive. In an aspect, films that have a moisture vapor transmission rate of about 30 grams per (meter squared×24 hours) or less can be considered a low moisture vapor transmissive material (as measured by ASTM E96-80). However, determining whether or not such a material will cause an unstable adhesive bond, bubbling, delamination, or loss of clarity, will depend on factors such as the adhesive composition and the adjacent substrate to which it is bonded. Examples of low moisture vapor transmission rate films include metallized films used for their antireflective or conductive properties (for example for EMI shielding) in optical elements. Metallized films include films such as polyethylene terephthalate (PET) or other polymeric materials that include a surface that is partially or fully coated with a metal or metallic material. One such polyethylene terephthalate film, is ICI 617, a 127 $\mu$m thick film from Imperial Chemical Industries Films (Hopewell, Va.). Other examples of metallized films include multilayer AR (antireflective) film such as described in U.S. Pat. No. 6,277,485 columns 13 and 14; and microlayer films such as those described in U.S. Pat. No. 6,049,419.

Polarizers, generally known to be heat and humidity sensitive materials, can also be bonded using an adhesive composition of the invention. These materials, such as one often referred to industry as a "KE polarizer" are often provided as very thin films. Due to their thinness, these films can shrink when exposed to a certain minimum temperature and humidity. By applying and curing an adhesive composition of the invention, a resultant IPN is thereby provided to offer strength to the film.

The invention further relates to methods of using the curable PSA adhesives. The curable adhesive compositions may be applied by any conventional application method, including but not limited to gravure coating, curtain coating, slot coating, spin coating, screen coating, transfer coating, brush or roller coating, and the like. The thickness of a coated adhesive layer, (sometimes provided in liquid form), prior to curing, can be any thickness that results in the desired properties, as is well understood in the art. Exemplary thicknesses of an uncured, curable adhesive layer may be in the range from about 0.05 to about 125 micrometers.

The amount of cure time to harden or cure the adhesive can vary, depending on a variety of factors, such as the components present in the adhesive composition, the substrates used, as well as the thickness of the applied layer. Use of a UV irradiation source can significantly lower the cure time necessary to cure adhesives of the invention, compared to, for example, thermal (heat) curing techniques. Thus, practicing a method according to the invention can provide faster manufacturing processes, and can lead to decreased operating costs.

In an aspect, an adhesive composition can be applied onto a surface of a substrate, contacting the curable adhesive with another material, and then curing the adhesive composition. Lamination can be used to contact the two materials, having the adhesive therebetween. Optionally, methods can also include applying the adhesive onto a release liner; drying any solvent in the adhesive; laminating; polymerizing or curing the acrylate oligomers and optionally acrylate copolymers; and any other steps, techniques, or methods known to be used in the preparation of multi-layer articles.

In some optical applications, optical films are laminated onto other optical substrates, and subsequently, portions of the optical films need to be cut and then cleanly removed to make special patterns. Adhesives of the invention can be quite useful in these types of applications, as the adhesives as well as unwanted film portions (e.g. weed) can be cleanly removed in the first stage prior to energy beam cure (e.g. UV irradiation). Once the optical film patterns and designs are set, then energy can subsequently be applied to cure and harden the adhesive, to provide a secure and stable bond.

Preparing the adhesive compositions can be conducted using any of the numerous conventional methods for combining, blending, and optionally reacting (meth)acrylate materials, acrylate copolymers, acrylated oligomers, initiators, and any adjuvants. See for example, U.S. Pat. Nos. 5,252,694, 5,897,727, and 6,180,200. Generally, acrylate copolymer materials such as those described above can be directly combined with the described acrylated oligomers and other components of a curable adhesive composition, including crosslinkers, initiators, etc., in amounts as useful and as described herein. While solventless embodiments are visualized within the scope of this invention, it is contemplated that solvents can be used to prepare embodiments of the adhesive compositions. Representative solvents can be organic, and include acetone, methyl-ethyl-ketone, ethyl acetate, heptane, toluene, cyclopentanone, methyl cellosolve acetate, methylene chloride, nitromethane, methyl formate, gamma-butyrolactone, propylene carbonate, and 1,2-dimethoxyethane (glyme).

If a photoinitiator is used, irradiation sources that provide energy (e.g., light) in the region from 200 to 800 nm can be used to cure embodiments of the adhesive composition. In an aspect, a useful region of light is about 250 to about 700 nm. Suitable sources of radiation to initiate actinic curing include mercury vapor discharge lamps, carbon arcs, quartz halogen lamps, tungsten lamps, xenon lamps, fluorescent lamps, lasers, sunlight, etc. The amount of radiation exposure to effect polymerization can depend on factors such as the identity and concentrations of particular free radically polymerizable oligomers, the thickness of the exposed material, the type of substrate(s), the intensity of the radiation source and the amount of heat associated with the radiation. Alternatively, other sources of energy such as e-beam and gamma ray can be used for curing the adhesive, with or without an added initiator.

EXAMPLES

These examples are merely for illustrative purposes only and are not meant to be limiting on the scope of the invention. All parts, percentages, ratios, etc. in the examples are by weight unless indicated otherwise.

| Table of Abbreviations | |
|---|---|
| AA | Acrylic Acid |
| BA | n-Butyl Acrylate |
| CGL 139 | Benzotriazole UV absorber (CIBA Specialty Chemicals Corp; Tarrytown, NJ) |
| CN131 | Mono-acrylate oligomer from Sartomer with a Tg of 4° C. |
| CN135 | Mono-acrylate oligomer from Sartomer with a Tg of 20° C. |
| CN137 | Mono-acrylate oligomer from Sartomer with a Tg of 40° C. |
| CN964 | Urethane diacrylate oligomer from Sartomer, used as a 33% solution in ethyl acetate |
| EBECRYL CL 1039 | Urethane mono-acrylate oligomer (UCB Chemicals; Smyrna, GA) |
| EtOAc | Ethyl Acetate |
| Glass Microscope Slides | 75 millimeter × 50 millimeter × 1 millimeter Corning No. 2947 Microslides (Corning Glass Works; Corning, NY) |
| IOA | Isooctyl acrylate |
| IR Film | Multilayer IR reflecting film comprises alternating layers of PET (A-layer) and co-PMMA (B-layer). These layers are arranged in 6 layer optical repeat units: 7A, 1B, 1A, 7B, 1A, 1B with 96 such optical repeat units for a total of 576 layers. This film reflects light in the infrared wave-length region between about 900–1300 nm while allowing light transmission in the visible region between 380–770 nm. |
| IRGACURE 819 | Photo curing agent, (CIBA) |
| MA | Methyl Acrylate |
| MELAK | Melamine crosslinked polyacrylate primer |
| PF Film | Multi-layer optical photosensor film of 96.5 micrometer thickness (3 M Co.; St. Paul, MN) |
| PC | Sheets of polycarbonate of 3 mm thickness (Bayer-Sheffield Plastics Inc.; Sheffield, MA) |
| PET | Polyethylene terephthalate |
| PET Film | ICI 617 127 micrometer thick PET film (Imperial Chemical Industries Films; Hopewell, VA) |
| PMMA | Sheets of polymethylmethacrylate of 3 mm thickness |
| PSA-1 | A solvent based PSA prepared according to conventional radical thermal polymerization procedure using the monomers IOA/MA/AA in the ratio 57.5/35/7.5, used as a 26% solids solution in ethyl acetate/toluene. |
| PSA-2 | A solvent based PSA prepared according to conventional radical thermal polymerization procedure using the monomers IOA/AA in the ratio 81/19, used as a 19% solids solution in ethyl acetate/toluene. |
| RH | Relative Humidity |
| T-10 Release Liner | CP Film T-10 silicone release coating on 51 micrometer PET film (CP Film; Martinsville, VA) |
| T-30 Release Liner | CP Film T-30 silicone release coating on 51 micrometer PET film (CP Film; Martinsville, VA) |
| TINUVIN 123 | Hindered Amine Light Stabilizer (CIBA Specialty Chemicals Corp.; Tarrytown, NJ) |
| Xlinker | Bis-aziridine crosslinker in 5 wt % solution, described in U.S. Pat. Nos. 5,874,143 column 4, line 49. |

Test Methods

Accelerated Aging Test

Accelerated aging tests were conducted at three different conditions: 90° C.; 60° C./90% RH and 80° C./90% RH. The aging test results are determined by visual observation and reported as either "Pass" if the sample retains its optical clarity and no other defects formed during the aging test, or "Fail" if bubbles are present in the adhesive bond line or if delamination occurred at the adhesive bond line.

Optical Property Measurements

Luminous Transmittance and Haze

The luminous transmittance and haze of all samples were measured by using a TCS Plus Spectrophotometer from BYK-Gardner Inc.; Silver Springs, Md. Haze and opacity values are given for both illuminant C with CIE 2° standard observer (C2°) and illuminant A with CIE 2° standard observer (A2°). Sample preparation details are described in the text.

Opacity Measurement

The same samples used for haze and luminous transmittance measurements were used for opacity measurement. The BYK Gardner TCS Plus Spectrophotometer was used for opacity measurement, with the standard size reflectance port (25 mm) installed, and diffuse reflectance (specular excluded) was measured.

180° Peel Adhesion

This peel adhesion test is similar to the test method described in ASTM D 3330-90. Adhesive laminates with dimensions of 2.54 centimeters by 15 centimeters were adhered to a IMASS slip/peel tester (Model 3M90 or SP-2000, commercially available from Instrumentors Inc., Strongsville, Ohio). The bonded assembly dwelled at room temperature for about one minute and was tested for 180° peel adhesion at a rate of 0.30 meters/minute (12 inches/minute) over a five second data collection time. Two samples were tested; the reported peel adhesion value is an average of the peel adhesion value from each of the two samples.

90° Peel Adhesion

The peel force was measured using an INSTRON tensile tester (commercially available from Instron Corp.; Canton, Mass.) at a peel angle of 90 degrees and a peel rate of 0.30 meters/minute (12 inches/minute).

Examples 1–4

Adhesive Preparation

In a brown glass reaction vessel was placed IRGACURE 819 and EtOAc in the amounts shown in Table 1. Once dissolved, the remaining components shown in Table 1 were added and the resulting mixture was mixed well to yield an adhesive mixture with 30 weight % acrylated oligomer content.

Laminate Preparation

The adhesive solutions described above were coated onto the MELAK primed side of an IR Film, dried at 70° C. for 10 minutes to yield a 37.5 μm thick dry PSA tape. Samples of this PSA tape were laminated onto Polycarbonate Sheets and PMMA Sheets. After 24 hour dwell, these laminates were irradiated (through the IR Film) with a Fusion UV Curing System at the following conditions for a total UVA (320–390 nm) dose of about 2 J/cm$^2$: Fusion "D" bulb, 300 Watts/Inch, 25 feet/minute, 2 passes. After irradiation, these samples were stored at ambient temperature for at least 24 hours before any aging test was carried out.

Aging Test

The above prepared laminates of IR Film/Adhesive/PC Sheet and IR Film/Adhesive/PMMA Sheet were tested at 90° C. and 60° C./90% RH conditions using the test method described above. Aging tests conducted for 1 week at each of the test conditions resulted in a "PASS" score for all samples of Examples 1–4.

Peel Adhesion

180° peel adhesion testing was carried out using the test method described above on the above prepared laminates. The results are shown in Table 2.

TABLE 2

| Example Adhesive | Average 180° Peel of IR Film/Adhesive/PMMA cured laminate (N/dm) | Average 180° Peel of IR Film/Adhesive/PC cured laminate (N/dm) |
|---|---|---|
| 1 | 80.8 | 129.8 |
| 2 | 76.7 | 87.6 |
| 3 | 79.6 | 81.8 |
| 4 | 120.6 | 109.6 |

Example 5

The adhesive solution prepared in Example 1 was coated onto the MELAK primed side of an IR Film, dried at 70° C. for 10 minutes to yield a 37.5 μm thick dry PSA tape. This PSA tape was then UV cured (Fusion "D" bulb, 300 Watts/Inch, 25 feet/minute, 2 passes), and heat laminated onto PMMA Sheets using the following procedure: place both PSA tape and PMMA Sheets in a 85° C. oven for two minutes, and then hand laminate PSA tape onto PMMA sheets with a rubber roller. After 24 hours dwell, these laminates passed 1-week aging test at 90° C. and 60° C./90% RH conditions.

Examples 6–9

Adhesive Preparation

In a brown glass reaction vessel were placed the components shown in Table 3 and the resulting mixture was mixed well.

TABLE 1

| Example | CN964 (gram) | EtOAc (gram) | IRGACURE 819 (mg) | PSA-1 (gram) | EBECRYL CL 1039 (gram) | Xlinker (mg, wt %) |
|---|---|---|---|---|---|---|
| 1 | 1.75 | 5 | 172 | 20 | 1.733 | 104 0.1% |
| 2 | 1.75 | 5 | 172 | 20 | 1.733 | 208 0.2% |
| 3 | 1.75 | 5 | 172 | 20 | 1.733 | 312 0.3% |
| 4 | 1.75 | 5 | 172 | 20 | 1.733 | 416 0.4% |

TABLE 3

| Example | Wt % acrylate oligomers (%) | CN964 (gram) | IRGACURE 819 (mg) | CGL 139 (mg) | PSA-2 (gram) | EBECRYL CL 1039 (gram) |
|---|---|---|---|---|---|---|
| 6 | 35 | 2.12 | 172 | 160 | 27.37 | 2.1 |
| 7 | 40 | 2.62 | 172 | 173 | 27.37 | 2.6 |
| 8 | 45 | 3.22 | 172 | 189 | 27.37 | 3.2 |
| 9 | 50 | 3.94 | 172 | 208 | 27.37 | 3.9 |

Laminate Preparation

Laminates were prepared as described for Examples 1–4.

Aging Test

The above prepared laminates of IR Film/Adhesive/PC Sheet and IR Film/Adhesive/PMMA Sheet were tested at 90° C. and 60° C./90% RH conditions using the test method described above. Aging tests conducted for 42 days at each of the test conditions resulted in a "PASS" score for all samples of Example Adhesives 6–9.

Examples 10–15

Adhesive Preparation

In a brown glass reaction vessel were placed the components shown in Table 4 and the resulting mixture was mixed well.

TABLE 4

| Example | CN964 (gram) | IRGACURE 819 (mg) | CGL 139 (mg) (wt %) | PSA-2 (gram) | EBECRYL CL 1039 (gram) | TINUVIN 123 (mg) |
|---|---|---|---|---|---|---|
| 10 | 2.63 | 172 | 173 2% | 27.37 | 2.6 | 0 |
| 11 | 2.63 | 172 | 346 4% | 27.37 | 2.6 | 0 |
| 12 | 2.63 | 172 | 519 6% | 27.37 | 2.6 | 0 |
| 13 | 2.63 | 172 | 173 2% | 27.37 | 2.6 | 430 |
| 14 | 2.63 | 172 | 346 4% | 27.37 | 2.6 | 430 |
| 15 | 2.63 | 172 | 519 6% | 27.37 | 2.6 | 430 |

Laminate Preparation

Laminates were prepared as described for Examples 1–4.

Aging Test

The above prepared IR Film/Adhesive/PC Sheet and IR Film/Adhesive/PMMA Sheet were tested at 90° C. and 60° C./90% RH conditions using the test method described above. Aging tests conducted for 30 days at each of the test conditions resulted in a "PASS" score for all samples of Examples 10–15.

Examples 16–21 and
Comparative Examples C1–C3

Adhesive Preparation

In a brown glass reaction vessel were placed the components shown in Table 5 and the resulting mixture was mixed well.

TABLE 5

| Example | Wt % Acrylated Oligomers | CN964 (gram) | IRGACURE 819 (mg) | PSA-2 (gram) | EBECRYL CL 1039 (gram) |
|---|---|---|---|---|---|
| C1 | 0 | 0 | 0 | 27.37 | 0 |
| C2 | 10 | 0.44 | 172 | 27.37 | 0.43 |
| C3 | 15 | 0.70 | 172 | 27.37 | 0.69 |
| 16 | 20 | 0.98 | 172 | 27.37 | 0.98 |
| 17 | 25 | 1.31 | 172 | 27.37 | 1.3 |
| 18 | 35 | 2.12 | 172 | 27.37 | 2.1 |
| 19 | 40 | 2.63 | 172 | 27.37 | 2.6 |
| 20 | 45 | 3.22 | 172 | 27.37 | 3.2 |
| 21 | 50 | 3.94 | 172 | 27.37 | 3.9 |

Laminate Preparation

Laminates were prepared as described for Examples 1–4.

Aging Test

The above prepared IR Film/Adhesive/PC Sheet and IR Film/Adhesive/PMMA Sheet were tested at 90° C. and 60° C./90% RH conditions using the test method described above. The results are presented in Tables 6–8.

TABLE 6

| Example Adhesive in IR Film/Adhesive/PMMA Laminate | Aging Test Conditions (90° C. for 54 days) |
|---|---|
| C2 | Fail |
| C3 | Fail |
| 16 | Pass |
| 17 | Pass |

TABLE 7

| Example Adhesive in IR Film/Adhesive/PMMA Laminate | Aging Test Conditions (90° C. for 34 days) | Aging Test Conditions (60° C./90% RH for 34 days) |
| --- | --- | --- |
| C1 | Fail | Fail |
| 18 | Pass | Pass |
| 19 | Pass | Pass |
| 20 | Pass | Pass |
| 21 | Pass | Pass |

TABLE 8

| Example Adhesive in IR Film/Adhesive/PC Laminate | Aging Test Conditions (90° C. for 34 days) | Aging Test Conditions (60° C./90% RH for 34 days) |
| --- | --- | --- |
| C1 | Fail | Fail |
| 18 | Pass | Pass |
| 19 | Pass | Pass |
| 20 | Pass | Pass |
| 21 | Pass | Pass |

Example 22
Adhesive Preparation

The components shown in Table 9 were placed in a brown glass reaction vessel and the resulting mixture was mixed well.

TABLE 9

| Example | Wt % acrylated oligomers | CN964 (gram) | IRGACURE 819 (mg) | PSA-2 (gram) | EBECRYL CL 1039 (gram) |
| --- | --- | --- | --- | --- | --- |
| 22 | 30 | 1.75 | 172 | 27.37 | 1.73 |

Optical Measurements

Laminates of the adhesive prepared above were prepared as described in Examples 1–4 except Glass Microscope Slides were used instead of PMMA or PC. The optical properties were measured using the test methods described above. The results are shown in Table 10. Reference information for the Glass Microscope Slides, IR Film with MELAK Primer are also included.

TABLE 10

| Sample | T % | Haze % C2°/A2° | Opacity % C2°/A2° |
| --- | --- | --- | --- |
| Glass Microscope Slides | 92.3 | 0.5/0.5 | 0.3/0.3 |
| IR Film/MELAK Primer | 89.5 | 0.7/0.7 | 0.7/0.7 |
| IR Film/Adhesive Example 22/Glass; before UV treatment | 86.1 | 1.1/1.1 | 0.5/0.5 |
| IR Film/Adhesive Example 22/Glass; after UV treatment | 88.68 | 1.0/1.0 | 0.5/0.5 |
| *IR Film/Adhesive Example 22/Glass; before UV treatment | 93.2 | N/A | N/A |
| *IR Film/Adhesive Example 22/Glass; after UV treatment | 96.0 | N/A | N/A |

*samples were measured using glass to calibrate, i.e. T % of glass = 100%.

Laminate Preparation

Laminates of PF/adhesive/PF were prepared using the procedure described for Examples 1–4 except that PF substrates were used in place of IR Film and PC or PMMA.

Aging Test

The above prepared PF/Adhesive/PF Sheet was tested at 90° C., 60° C./90% RH, and 80° C./90% RH conditions using the test method described above. Aging tests conducted for 30 days at each of the test conditions resulted in a "PASS" score for the Adhesive Example 22.

Peel Adhesion

90° peel adhesion samples were prepared by coating the adhesive onto T-30 Release Liner, drying at 70° C. for 10 minutes, and further laminated with another T-10 Release Liner to yield a transfer PSA of 114 micrometer in PSA thickness. This transfer PSA was laminated onto anodized Aluminum foil backing film, and further laminated onto a glass substrate. The 90° peel testing was carried out using the test method described above. When the laminate was made with zero dwell time prior to light activation, the peel strength was determined to be 70.0 N/dm. When the laminate had been allowed to dwell overnight before light activation, the peel strength as determined to be 105.0 N/dm.

Examples 23–26 and Comparative Example C4
Adhesive Preparation

In a brown glass reaction vessel were placed the components shown in Table 11 and the resulting mixture was mixed well.

TABLE 11

| Example | Wt % acrylated oligomers | CN964 (gram) | IRGACURE 819 (mg) | PSA-2 (gram) | CN131 (gram) |
| --- | --- | --- | --- | --- | --- |
| C4 | 10 | 0.44 | 172 | 27.37 | 0.43 |
| 23 | 20 | 0.98 | 172 | 27.37 | 0.98 |
| 24 | 30 | 1.75 | 172 | 27.37 | 1.7 |
| 25 | 40 | 2.62 | 172 | 27.37 | 2.6 |
| 26 | 50 | 3.94 | 172 | 27.37 | 3.9 |

Laminate Preparation

Laminates were prepared as described for Examples 1–4.

Aging Test

The above prepared IR Film/Adhesive/PC Sheet and IR Film/Adhesive/PMMA Sheet were tested at 90° C., 60° C./90% RH, and 80° C./90% RH conditions using the test method described above. The results are presented in Tables 12–13.

TABLE 12

| Example Adhesive in IR Film/Adhesive/PMMA Laminate | Aging Test Conditions (90° C. for 30 days) | Aging Test Conditions (60° C./90% RH for 30 days) | Aging Test Conditions (80° C./90% RH for 7 days) |
| --- | --- | --- | --- |
| C4 | Fail | Fail | Fail |
| 23 | Pass | Pass | Pass |
| 24 | Pass | Pass | Pass |
| 25 | Pass | Pass | Pass |
| 26 | Pass | Pass | Pass |

TABLE 13

| Example Adhesive in IR Film/Adhesive/PC Laminate | Aging Test Conditions (90° C. for 30 days) | Aging Test Conditions (60° C./90% RH for 30 days) | Aging Test Conditions (80° C./90% RH for 7 days) |
| --- | --- | --- | --- |
| C4 | Fail | Fail | Fail |
| 23 | Pass | Pass | Pass |
| 24 | Pass | Pass | Pass |
| 25 | Pass | Pass | Pass |
| 26 | Pass | Pass | Pass |

Optical Measurements

Optical properties of the laminates of the IR Film/adhesive/PC prepared above were measured using the test methods described above. The results are shown in Table 14.

TABLE 14

| Example | Weight % Acrylated Oligomers | T %* | Haze % C2°/A2° | Opacity % C2°/A2° |
|---|---|---|---|---|
| C4 | 10 | 97.04 | 1.4/1.4 | 1.0/1.0 |
| 23 | 20 | 97.19 | 1.4/1.4 | 1.0/1.0 |
| 24 | 30 | 95.58 | 1.6/1.5 | 1.0/1.0 |
| 25 | 40 | 91.52 | 3.7/3.3 | 1.8/1.7 |
| 26 | 50 | 87.14 | 15.5/14.2 | 3.8/3.6 |

*samples were measured using PC to calibrate, i.e. T % of PC = 100%.

Comparative Examples C5–C9

Adhesive Preparation

In a brown glass reaction vessel were placed the components shown in Table 15 and the resulting mixture was mixed well.

TABLE 15

| Example | Wt % acrylated oligomers | CN964 (gram) | IRGACURE 819 (mg) | PSA-2 (gram) | CN135 (gram) |
|---|---|---|---|---|---|
| C5 | 10 | 0.44 | 172 | 27.37 | 0.43 |
| C6 | 20 | 0.98 | 172 | 27.37 | 0.98 |
| C7 | 30 | 1.75 | 172 | 27.37 | 1.7 |
| C8 | 40 | 2.62 | 172 | 27.37 | 2.6 |
| C9 | 50 | 3.94 | 172 | 27.37 | 3.9 |

Laminate Preparation

Laminates were prepared as described for Examples 1–4.

Aging Test

The above prepared IR Film/Adhesive/PC Sheet and IR Film/Adhesive/PMMA Sheet were tested at 90° C., 60° C./90% RH, and 80° C./90% RH conditions using the test method described above. The results are presented in Tables 16–17.

TABLE 16

| Example Adhesive in IR Film/Adhesive/PMMA Laminate | Aging Test Conditions (90° C. for 7 days) | Aging Test Conditions (60° C./90% RH for 7 days) | Aging Test Conditions (80° C./90% RH for 7 days) |
|---|---|---|---|
| C5 | Fail | Fail | Fail |
| C6 | Fail | Fail | Fail |
| C7 | Pass | Pass | Fail |
| C8 | Pass | Pass | Fail |
| C9 | Fail | Pass | Fail |

TABLE 17

| Example Adhesive in IR Film/Adhesive/PC Laminate | Aging Test Conditions (90° C. for 7 days) | Aging Test Conditions (60° C./90% RH for 7 days) | Aging Test Conditions (80° C./90% RH for 7 days) |
|---|---|---|---|
| C5 | Fail | Fail | Fail |
| C6 | Fail | Fail | Fail |
| C7 | Fail | Fail | Fail |
| C8 | Fail | Fail | Fail |
| C9 | Fail | Fail | Fail |

Optical Measurements

Optical properties of the laminates of the IR Film/adhesive/PMMA prepared above were measured using the test methods described above. The results are shown in Table 18.

TABLE 18

| Example | Weight % Acrylated oligomers | T %* | Haze % C2°/A2° | Opacity % C2°/A2° |
|---|---|---|---|---|
| C5 | 10 | 91.9 | 5.4/5.2 | 1.8/1.7 |
| C6 | 20 | 88.5 | 16.2/15.2 | 2.7/2.6 |
| C7 | 30 | 88.9 | 38.0/36.1 | 4.1/3.9 |
| C8 | 40 | 87.4 | 45.8/43.3 | 4.5/4.4 |
| C9 | 50 | 78.7 | 47.8/46.5 | 5.2/5.0 |

*samples were measured using PMMA to calibrate, i.e. T % of PMMA = 100%.

Comparative Examples C10–C14

Adhesive Preparation

In a brown glass reaction vessel were placed the components shown in Table 19 and the resulting mixture was mixed well.

TABLE 19

| Example | Wt % Acrylated oligomers | CN964 (gram) | IRGACURE 819 (mg) | PSA-2 (gram) | CN137 (gram) |
|---|---|---|---|---|---|
| C10 | 10 | 0.44 | 172 | 27.37 | 0.43 |
| C11 | 20 | 0.98 | 172 | 27.37 | 0.98 |
| C12 | 30 | 1.75 | 172 | 27.37 | 1.7 |
| C13 | 40 | 2.62 | 172 | 27.37 | 2.6 |
| C14 | 50 | 3.94 | 172 | 27.37 | 3.9 |

Laminate Preparation

Laminates were prepared as described for Examples 1–4.

Aging Test

The above prepared IR Film/Adhesive/PC Sheet and IR Film/Adhesive/PMMA Sheet were tested at 90° C., 60° C./90% RH, and 80° C./90% RH conditions using the test method described above. The results are presented in Tables 20–21.

TABLE 20

| Example Adhesive in IR Film/Adhesive/PMMA Laminate | Aging Test Conditions (90° C. for 7 days) | Aging Test Conditions (60° C./90% RH for 7 days) | Aging Test Conditions (80° C./90% RH for 7 days) |
|---|---|---|---|
| C10 | Fail | Fail | Fail |
| C11 | Pass | Fail | Fail |
| C12 | Pass | Fail | Fail |
| C13 | Fail | Fail | Fail |
| C14 | Fail | Fail | Fail |

TABLE 21

| Example Adhesive in IR Film/Adhesive/PC Laminate | Aging Test Conditions (90° C. for 7 days) | Aging Test Conditions (60° C./90% RH for 7 days) | Aging Test Conditions (80° C./90% RH for 7 days) |
|---|---|---|---|
| C10 | Fail | Fail | Fail |
| C11 | Fail | Fail | Fail |
| C12 | Fail | Fail | Fail |
| C13 | Fail | Fail | Fail |
| C14 | Fail | Fail | Fail |

Optical Measurements

Optical properties of the laminates of the IR Film/adhesive/PMMA prepared above were measured using the test methods described above. The results are shown in Table 22.

TABLE 22

| Example | Weight % Acrylated Oligomers | T %* | Haze % C2°/A2° | Opacity % C2°/A2° |
|---|---|---|---|---|
| C10 | 10 | 91.6 | 10.4/9.7 | 2.3/2.3 |
| C11 | 20 | 90.9 | 19.1/18.1 | 2.5/2.4 |
| C12 | 30 | 91.5 | 29.6/28.1 | 3.0/3.0 |
| C13 | 40 | 90.8 | 41.4/39.4 | 3.7/3.6 |
| C14 | 50 | 88.4 | 44.3/42.6 | 4.3/4.3 |

*samples were measured using PMMA to calibrate, i.e. T % of PMMA = 100%.

A number of embodiments of the invention have been described. Nevertheless, it will be understood that various modifications may be made without departing from the spirit and scope of the invention. Accordingly, other embodiments are within the scope of the following claims.

What is claimed is:

1. An adhesive composition comprising:
   an acrylate copolymer;
   a mono-acrylate oligomer;
   a multi-acrylate oligomer having 2 to 5 acrylate functionalities; and
   a photoinitiator that initiates free radical polymerization;
   wherein said mono-acrylate oligomer is present in an amount greater than the amount of said multi-acrylate oligomer, and wherein said mono-acrylate oligomer, multi-acrylate oligomer and photoinitiator, when blended with said acrylate copolymer, forms a pressure sensitive adhesive, and when cured, forms a cured adhesive comprising at least a semi-interpenetrating polymer network having an average molecular weight between crosslinks ($M_c$) greater than about 3000, said cured adhesive having a peel strength greater than about 40 N/dm.

2. The composition of claim 1, wherein the mono-acrylate oligomer has a $T_g$ of less than about 20° C.

3. The composition of claim 1 wherein the multi-acrylate oligomer has a $T_g$ of less than about 20° C.

4. The composition of claim 1 wherein at least one of the mono-acrylate oligomer and the multi-acrylate oligomer is selected from a group consisting of a urethane acrylate oligomer; polyester acrylate oligomer; and a polyether acrylate oligomer.

5. The composition of claim 1 wherein at least one of the mono-acrylate oligomer and the multi-acrylate oligomer comprises urethane acrylate oligomer.

6. The composition of claim 1 further comprising a UV absorber.

7. The composition of claim 6 wherein said UV absorber is capable of absorbing radiation having a wavelength less than about 410 nm.

8. The composition of claim 1 wherein the adhesive composition, when cured, has an optical transmissivity greater than about 90%.

9. The composition of claim 1, further comprising a crosslinker reactive with said acrylate copolymer.

10. The composition of claim 1, further comprising a hindered amine light stabilizer.

11. The composition of claim 1, wherein the ratio of the amount of mono-acrylate oligomer to multi-acrylate oligomer is about 3:1.

12. The composition of claim 1, wherein the ratio of the amount of mono-acrylate oligomer to multi-acrylate oligomer is about 6:1.

13. The composition of claim 1, wherein said composition is UV-curable.

14. The composition of claim 1, wherein said mono-acrylate oligomer and said multi-acrylate oligomer are present in the composition at greater than about 20 wt. percent of the total weight of the composition.

15. The composition of claim 14, wherein said mono-acrylate oligomer and said multi-acrylate oligomer are present in the composition at less than about 60 wt. percent of the total weight of the composition.

16. A curable adhesive composition comprising:
   an acrylate copolymer;
   a mono-acrylate oligomer;
   a multi-acrylate oligomer having 2 to 5 acrylate functionalities;
   an ultra-violet light absorber; and
   a photoinitiator that initiates free radical polymerization;
   wherein
   said mono-acrylate oligomer is present in an amount greater than the amount of said multi-acrylate oligomer;
   said mono-acrylate oligomer, multi-acrylate oligomer and photoinitiator, when blended with said acrylate copolymer, forms a pressure sensitive adhesive; and
   said blend of oligomers and copolymer, when actinically cured, forms a cured adhesive comprising at least a semi-interpenetrating polymer network with an average molecular weight between crosslinks ($M_c$) greater than about 3000; said cured adhesive exhibiting substantial optical clarity, ultra-violet light absorbing capability, and a peel strength greater than about 40 N/dm.

17. The composition of claim 16, further comprising a hindered amine light stabilizer.

18. The composition of claim 16, wherein the ratio of the amount of mono-acrylate oligomer to multi-acrylate oligomer is about 3:1.

19. The composition of claim 16, wherein the ratio of the amount of mono-acrylate oligomer to multi-acrylate oligomer is about 6:1.

20. The composition of claim 16, wherein at least one of said mono-acrylate oligomer and multi-acrylate oligomer comprises urethane acrylate oligomer.

21. The composition of claim 16, wherein at least one of said mono-acrylate oligomer and multi-acrylate oligomer has a $T_g$ less than about 20° C.

* * * * *